United States Patent
Menashe et al.

(10) Patent No.: US 12,461,846 B2
(45) Date of Patent: *Nov. 4, 2025

(54) EXTRACTING CODE PATCHES FROM BINARY CODE FOR INDEPENDENT FUZZ TESTING

(71) Applicant: JFROG LTD, Netanya (IL)

(72) Inventors: Shachar Menashe, Herzliya (IL); Ilya Khivrich, Rehovot (IL); Asaf Karas, Ramat Gan (IL)

(73) Assignee: JFROG LTD, Netanya (IL)

( * ) Notice: Subject to any disclaimer, the term of this patent is extended or adjusted under 35 U.S.C. 154(b) by 163 days.

This patent is subject to a terminal disclaimer.

(21) Appl. No.: 18/150,637

(22) Filed: Jan. 5, 2023

(65) Prior Publication Data

US 2023/0141948 A1    May 11, 2023

Related U.S. Application Data

(63) Continuation of application No. 16/953,500, filed on Nov. 20, 2020, now Pat. No. 11,573,887.

(51) Int. Cl.
*G06F 11/3668* (2025.01)
*G06F 21/57* (2013.01)

(52) U.S. Cl.
CPC ...... *G06F 11/3696* (2013.01); *G06F 11/3684* (2013.01); *G06F 11/3688* (2013.01);
(Continued)

(58) Field of Classification Search
CPC ..... G06F 11/36–3696; G06F 2221/033; G06F 21/56–629; G06F 11/3698
See application file for complete search history.

(56) References Cited

U.S. PATENT DOCUMENTS

| | | | |
|---|---|---|---|
| 8,438,553 B2* | 5/2013 | Komatsu | G06F 8/30 717/151 |
| 2010/0138810 A1* | 6/2010 | Komatsu | G06F 8/30 712/E9.071 |

(Continued)

OTHER PUBLICATIONS

Lanzi, A., et al. "A Smart Fuzzer for x86 Executables", 29th Int'l Conf. on Software Engineering Workshops [online], 2007 [retrieved Nov. 30, 2024], Retrieved from Internet: <URL: https://citeseerx.ist.psu.edu/document?repid=rep1&type=pdf&doi=7f2a436d9889f318c8a297cb0a6d701593b79f70>. pp. 1-7.*

(Continued)

*Primary Examiner* — Todd Aguilera
(74) *Attorney, Agent, or Firm* — PEARL COHEN ZEDEK LATZER BARATZ LLP

(57) ABSTRACT

A method, system and product comprising determining a characterization of a terminal within a binary code based on influences of the terminal, the characterization of the terminal indicates a role of the terminal in the binary code; based on the characterization of the terminal, determining that the terminal is potentially affected by external input to a device executing the binary code; determining for the terminal a corresponding propagation path within the binary code indicating a terminal reachability within the binary code; locating in the binary code a code patch associated with a functionality of the binary code, the code patch is associated with the propagation path of the terminal, the code patch can be executed independently from the binary code; extracting the code patch from the binary code for testing; generating an emulation of the code patch to enable fuzz testing of the emulation, the code patch is tested independently.

16 Claims, 4 Drawing Sheets

(52) U.S. Cl.
CPC ........ *G06F 11/3692* (2013.01); *G06F 21/577* (2013.01); *G06F 2221/033* (2013.01)

(56) References Cited

U.S. PATENT DOCUMENTS

| | | |
|---|---|---|
| 2021/0191845 A1 | 6/2021 | Bach et al. |
| 2021/0350006 A1* | 11/2021 | Krupp .................... G16Y 30/10 |
| 2021/0397148 A1 | 12/2021 | Ota et al. |

OTHER PUBLICATIONS

Kolbitsch, C., et al., "Inspector Gadget: Automated Extraction of Proprietary Gadgets from Malware Binaries", 2010 IEEE Symposium on Security and Privacy [online], 2010 [retrieved Nov. 30, 2024], Retrieved from Internet: <URL: https://ieeexplore.ieee.org/stamp/stamp.jsp?tp=&arnumber=5504785>, pp. 29-44.*

Deng, Z et al: "BISTRO: Ninary Component Extraction and Embedding for Software Security Applications": Lecture Notes in Computer Science, vol. 8134, 2013, pp. 200-218, published Mar. 2013.

* cited by examiner

EXTRACTING CODE PATCHES FROM BINARY CODE FOR INDEPENDENT FUZZ TESTING

TECHNICAL FIELD

The present disclosure relates to testing of embedded code in general, and to methods, systems and products for testing embedded devices without having access to their source code, in particular.

BACKGROUND

Computerized devices control almost every aspect of our life—from writing documents to controlling traffic lights. However, computerized devices are bug-prone, and thus require a testing phase in which the bugs should be discovered. The testing phase is considered one of the most difficult tasks in designing a computerized device. The cost of not discovering a bug may be enormous, as the consequences of the bug may be disastrous. For example, a bug may cause the injury of a person relying on the designated behavior of the computerized device. Additionally, a bug in firmware may be expensive to fix, as patching it requires recall of the computerized device. Hence, many developers of computerized devices invest a substantial portion, such as 70%, of the development cycle to discover erroneous behaviors of the computerized device.

Testing is even more important with relation to connected devices and Internet of Things (IoT) devices. As many devices that were once low-tech without computers or processors thereon, are now connected to the Internet and to sensitive networks, these devices are potentially exposed to cyber threats. Cybersecurity analysis may be performed for such devices and their embedded code to reduce the risk of cyber-attacks. Code testing is a time consuming and resource extensive task, and is even more challenging when the code being analyzed is given in low level, binary form, and without access to the original source code.

BRIEF SUMMARY

One exemplary embodiment of the disclosed subject matter is a method comprising: determining a characterization of a terminal of a plurality of terminals within a binary code based on influences of the terminal, wherein the terminal is a code artifact that serves to provide input to or output from a code unit of the binary code, wherein the influences indicate influences between the terminal and at least one of the plurality of terminals, wherein the characterization of the terminal indicates a role of the terminal in the binary code; based on the characterization of the terminal, determining that the terminal is potentially affected by external input that is inputted to a device executing the binary code; determining for the terminal a corresponding propagation path within the binary code, wherein the propagation path indicates a reachability of the terminal within the binary code; locating in the binary code a code patch associated with a functionality of the binary code, wherein the code patch is associated with the propagation path of the terminal, wherein the code patch comprises the terminal, wherein the code patch can be executed independently from the binary code, wherein the code patch comprises at least a first code element from a first code unit associated with a first hierarchy level of the binary code and a second code element from a second code unit associated with a second hierarchy level of the binary code, whereby crossing through different code hierarchy levels, wherein the code patch excludes at least a third code element of the first code unit; extracting the code patch from the binary code for testing; and generating an emulation of the code patch to enable fuzz testing of the emulation, whereby the code patch is tested independently.

Optionally, the code patch comprises one or more terminals that match a pattern of interest.

Optionally, the code patch comprises the propagation path.

Optionally, the first code unit is a first function, wherein the second code unit is a second function, whereby the code patch comprises at least two portions of two separate functions of the binary code.

Optionally, the first code unit is a first code file, wherein the second code unit is a second code file, whereby the code patch comprises at least two portions of two separate files of the binary code.

Optionally, each of the influences comprises an influence between an influencing terminal and an influenced terminal, wherein the influence indicates a change of a first value that is associated to the influenced terminal with a second value that is associated with the influencing terminal.

Optionally, the method comprises determining the characterization of the terminal to indicate that the terminal is an input, in response to a determination that the terminal only influences other terminals without being influenced by the other terminals, and determining the characterization of the terminal to indicate that the terminal is an output in response to a determination that the terminal is only influenced by other terminals without influencing the other terminals.

Optionally, the terminal comprises a function argument, a return value, a condition branch, a global variable, an offset of a buffer, or the like.

Optionally, the method comprises verifying that data entering a propagation path is propagated at least in part to an end of the propagation path, thereby identifying deployed defensive programming.

Optionally, the method comprises generating a test harness for the emulation based on the characterization of the terminal.

Optionally, generating the test harness comprises performing one or more memory allocations for execution of the emulation, loading one or more libraries that are utilized by the extracted code patch, and defining success and failure outcomes.

Another exemplary embodiment of the disclosed subject matter is computer program product comprising a non-transitory computer readable storage medium retaining program instructions, which program instructions when read by a processor, cause the processor to perform: determining a characterization of a terminal of a plurality of terminals within a binary code based on influences of the terminal, wherein the terminal is a code artifact that serves to provide input to or output from a code unit of the binary code, wherein the influences indicate influences between the terminal and at least one of the plurality of terminals, wherein the characterization of the terminal indicates a role of the terminal in the binary code; based on the characterization of the terminal, determining that the terminal is potentially affected by external input that is inputted to a device executing the binary code; determining for the terminal a corresponding propagation path within the binary code, wherein the propagation path indicates a reachability of the terminal within the binary code; locating in the binary code a code patch associated with a functionality of the binary code, wherein the code patch is associated with the propagation path of the terminal, wherein the code patch comprises the terminal, wherein the code patch can be executed independently from the binary code, wherein the code patch comprises at least a first code element from a first code unit associated with a first hierarchy level of the binary code and a second code element from a second code unit associated with a second hierarchy level of the binary code, whereby crossing through different code hierarchy levels, wherein the code patch excludes at least a third code element of the first code unit; extracting the code patch from the binary code for testing; and generating an emulation of the code patch to enable fuzz testing of the emulation, whereby the code patch is tested independently.

Yet another exemplary embodiment of the disclosed subject matter is a system comprising a processor and coupled memory, the processor being adapted to: determine a characterization of a terminal of a plurality of terminals within a binary code based on influences of the terminal, wherein the terminal is a code artifact that serves to provide input to or output from a code unit of the binary code, wherein the influences indicate influences between the terminal and at least one of the plurality of terminals, wherein the characterization of the terminal indicates a role of the terminal in the binary code; based on the characterization of the terminal, determine that the terminal is potentially affected by external input that is inputted to a device executing the binary code; determine for the terminal a corresponding propagation path within the binary code, wherein the propagation path indicates a reachability of the terminal within the binary code; locate in the binary code a code patch associated with a functionality of the binary code, wherein the code patch is associated with the propagation path of the terminal, wherein the code patch comprises the terminal, wherein the code patch can be executed independently from the binary code, wherein the code patch comprises at least a first code element from a first code unit associated with a first hierarchy level of the binary code and a second code element from a second code unit associated with a second hierarchy level of the binary code, whereby crossing through different code hierarchy levels, wherein the code patch excludes at least a third code element of the first code unit; extract the code patch from the binary code for testing; and generate an emulation of the code patch to enable fuzz testing of the emulation, whereby the code patch is tested independently.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
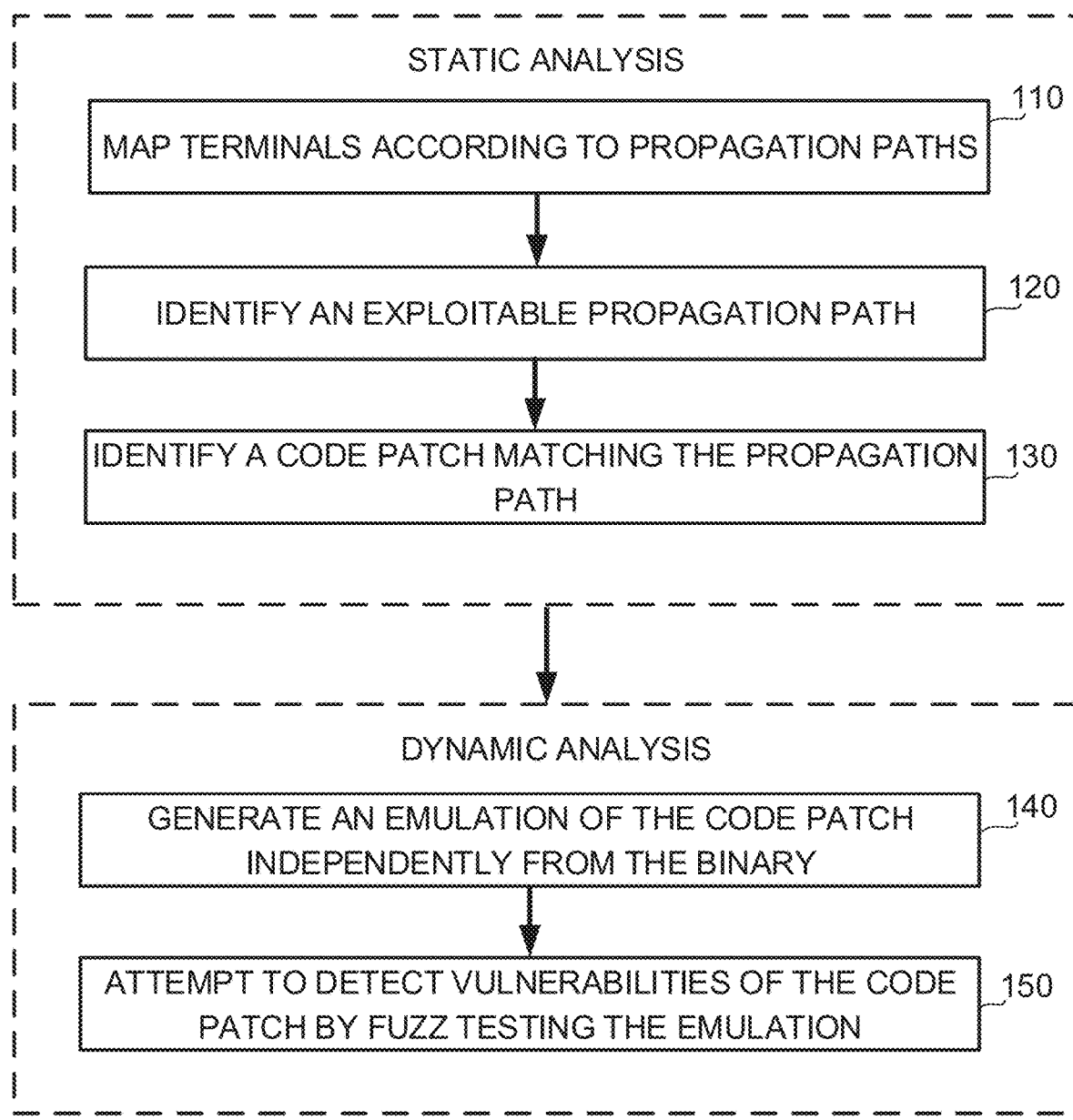
FIG. 1 illustrates a flowchart diagram of a method, in accordance with some exemplary embodiments of the disclosed subject matter.

One technical problem dealt with by the disclosed subject matter is to detect vulnerabilities or bugs of embedded devices by testing their embedded software, firmware, or the like. In some exemplary embodiments, code of embedded device may be designed for the particular device. In some exemplary embodiments, a vulnerability of an embedded device may include a weakness that may be exploited by a threat actor, such as an attacker or a malicious user, to perform unauthorized actions within a computer system. In some cases, embedded devices may have vulnerabilities that were not detected during a testing phase of the device, e.g., by the manufacturer or by any other testing agent.

Another technical problem dealt with by the disclosed subject matter is to detect vulnerabilities of an embedded device such as an Internet of Things (IoT) device, without having access to the source code, source files, or the like, of the device. In some cases, users may not have full or even partial access to a device's source code, high level code, or the like. Such limited access to the code may increase a difficulty of finding the vulnerabilities of the embedded device. For example, a user may purchase an IoT device that does not provide access to its source code, and may desire to detect vulnerabilities of its firmware. Additionally or alternatively, even a distributer or a certifying entity might not be privy to the source code itself, which may contain trade secrets, proprietary algorithms, or the like, and may not be shown by the developing party to any third party. In some exemplary embodiments, it may be challenging to detect vulnerabilities or bugs in embedded devices without having access to source code of the device's software or firmware. In some exemplary embodiments, it may be desired to detect vulnerabilities or bugs in embedded devices, where there may be limited access to the internal design and state of the device during execution.

Yet another technical problem dealt with by the disclosed subject matter is to perform fuzz-testing of embedded or IoT devices, e.g., without having access to source code of the device. In some exemplary embodiments, fuzzing or fuzz-testing may be an effective technique for locating errors, vulnerabilities, or the like. In some exemplary embodiments, fuzzing may comprise an automated software testing technique that involves providing invalid, unexpected, or random data as inputs to a computer program. In some exemplary embodiments, after implementing the fuzzing, the program may be monitored for exceptions such as crashes, failing built-in code assertions, or potential memory leaks. In some exemplary embodiments, it may be desired to adjust fuzz testing techniques to the embedded context, so that embedded devices, IoT devices, or the like, may be fuzz tested. In some exemplary embodiments, fuzzing embedded or IoT devices may be challenging since such devices typically comprise code that is configured to run on a specific processor, with specific hardware components, with a specific interface, specific libraries, or the like, while fuzz testing is performed on a platform that does not necessarily comprise such components. In some exemplary embodiments, it may be challenging to emulate or sufficiently define native binary to perform testing thereof, e.g., especially due to a typical lack of a sufficient interfaces such as a user interface, a hardware interface, a driver interface, or the like.

In some exemplary embodiments, a naïve method to perform fuzzing of embedded code may comprise manually modeling the ad hoc hardware environment of the embedded code, including the processor, inputs, hardware components, or the like. In some exemplary embodiments, testing native binary may be enabled by generating a full emulation of the embedded code. In some exemplary embodiments, this naïve method may have one or more drawback, for example, since such modeling may be difficult to implement, prohibitively slow, and may be practically almost impossible to implement due to dependence on device-specific hardware and libraries in the embedded context. Additionally, generating a full emulation may require exhaustive and comprehensive modeling, may be extremely time consuming, require highly skilled human resources, or the like. In some exemplary embodiments, accordingly, an application of fuzzing may be limited in the embedded context. An additional approach to embedded fuzzing may include performing black box testing using the IoT or embedded device itself as the black box, e.g., which may have one or more drawbacks such as having limited results, having limited capabilities, having associated high costs, having constraints on scalability, or the like. In some exemplary embodiments, it may be desired to automatically fuzz-test the embedded device's native binary, in order to potentially discover new implementation errors and vulnerabilities, without relying on manual labor. Additionally or alternatively, it may be desired to implement the fuzz-testing in a white-box configuration, where the internal state of the code can be examined and utilized.

In some exemplary embodiments, it may be advantageous to test specific portions of interest of the embedded code, instead of testing the entire embedded code at once. In some exemplary embodiments, testing the entire binary code as one unit may be inefficient for the case of large binaries, especially in case the tested functionality of interest is activated for a small fraction of inputs. In many cases, it would be technically impossible to test the entire binary code at once, as in case the tested binary requires access to additional components, e.g., hardware, drivers, libraries, system Application Programming Interfaces (APIs), or the like, which may not necessarily be available during testing for various reasons.

In some exemplary embodiments, slicing a code into small units and testing each such unit in unit testing technique may be inefficient and counter-productive. In some cases, different units may be tightly coupled and testing one without the other may result in false positive indications, in a poorly targeted testing, or the like.

One technical solution of the disclosed subject matter is to identify code patches of interest during a static analysis phase. During the static analysis phase the binary may be analyzed. After the identification fuzz testing of the identified patches may be performed during a subsequent dynamic analysis phase. In some exemplary embodiments, the static analysis stage may be configured to analyze the binary to obtain a coarse understanding of its components, functionalities, consequences, or the like, and to disassemble the binary into code patches of functionality based on the coarse understanding. In some exemplary embodiments, the code patches may be thoroughly analyzed to identify emulation configurations for the dynamic analysis. In some exemplary embodiments, instead of applying fuzzing on the entire binary, fuzzing may be applied independently on the selected code patches of the binary.

In some exemplary embodiments, the code patches may be obtained by identifying code portions of interest, identifying supplement portions that are needed in order to execute the portions of interest, e.g., parts of the binary on which the portions of interest depend, call, or the like, and extracting both code portions and supplement portions to obtain the selected code patches. In some exemplary embodiments, each identified code patch may be extracted, emulated and fuzz-tested separately, independently, or the like, from the remaining binary. In some exemplary embodiments, based on a combination of static analysis and dynamic fuzzing of the code, complex vulnerabilities may be located in the fuzz-tested code patches. It is noted that the code patch may be different than a code unit, and may include different code units, may include only some code sections of a code unit and exclude other code sections of the same code unit, or the like.

In some exemplary embodiments, a plurality of terminals may be identified in the binary, e.g., for each code unit, such as a function, a file, or the like. In some exemplary embodiments, the term "terminal" may relate to a code artifact that serves to provide input to or output from a code unit of the binary code. In some exemplary embodiments, terminals may include entry or exit points from code units in the binary code, from hierarchical levels of the binary code, or the like, via which data can be entered into a code location or returned from the code location. In some exemplary embodiments, a terminal may include a function argument, a function variable, a return value, a condition branch, a global variable, an offset of a buffer, a system call argument, or the like.

In some exemplary embodiments, terminals may comprise the content of specific registers or memory locations, at specific point in time over the course of execution of the code that may be expected to determine the execution flow, store the results of the computation at one or more stages of the execution, be indicative of an important aspect of the flow, or the like. As an example, a terminal may include a variable controlling an execution flow such as conditional branches. In some exemplary embodiments, terminals may include return variables that are inputted or outputted from a function, e.g., external level function arguments. As another example, terminals may include variables of internal calls such as system calls.

In some exemplary embodiments, an influence map between terminals may be determined. In some exemplary embodiments, influences between terminals may indicate that a data propagating path exists, directly or indirectly, between the terminals. In some exemplary embodiments, each influence between an influencing terminal and an influenced terminal may indicate a change of a first value that is associated to the influenced terminal by a second value that is associated with the influencing terminal. For example, a value that is copied from a first terminal to a second may be considered as influencing the second terminal with the value of the first terminal. Additionally or alternatively, a value in the first terminal that causes a branch to be taken and changes the second terminal may be a reason for indicating the first terminal as influencing the second terminal, although such influence is based on control flow dependency and not on data flow dependency.

In some exemplary embodiments, a characterization of one or more terminals of a plurality of terminals within a binary code may be determined, e.g., based on the influence map of the terminals. In some exemplary embodiments, the characterization of a terminal may indicate a role of the terminal in the binary code, an attribute of the terminal, a risk score of the terminal, or the like, e.g., based on influences between the terminal and at least one other terminal of the plurality of terminals. In some exemplary embodiments, the characterization of the terminal may be determined based on influence scores of the terminal, with respect to relevant terminals with which it has an influence relationship.

In some exemplary embodiments, the characterization of the terminal may be determined to indicate that the role of the terminal is an input, e.g., in response to a determination that the terminal only influences other terminals without being influenced by any other terminal. In some exemplary embodiments, the characterization of the terminal may be determined to indicate that the role of the terminal is an output, e.g., in response to a determination that the terminal is only influenced by other terminals without influencing the other terminals. In some exemplary embodiments, terminals may be characterized in any way, e.g., based on the influence map. It is noted that the characterization may change in view of different segmentation of the code. For example, an output terminal of a function may be considered the input terminal of a second function, if the second function is included in the analysis.

In some exemplary embodiments, based on characterizations of the terminals, roles of the terminals, or the like, one or more terminals of the binary may be determined to be potentially vulnerable. In some exemplary embodiments, the one or more terminals may be determined to be potentially affected by external input that is inputted to a device executing the binary code, to comprise potentially user-controllable data, or the like.

In some exemplary embodiments, for the one or more terminals that were determined to be potentially vulnerable, one or more corresponding propagation paths within the binary code may be determined, identified, or the like, e.g., according to the influence map of the terminals. In some exemplary embodiments, the propagation paths may indicate a reachability of the plurality of terminals within the binary code. In some exemplary embodiments, a terminal may be considered to reach a code area that is influenced thereby. In some exemplary embodiments, propagation paths may be determined for each terminal, for a subgroup of vulnerable terminals, for terminals that have certain characteristics, for terminals that are considered user-controllable, or the like In some exemplary embodiments, one or more exploitable propagation paths of terminals that are characterized as being potentially vulnerable, may be determined. In some exemplary embodiments, the one or more exploitable propagation paths may be determined to be potentially affected by external input, e.g., since their terminals are determined to be potentially exploitable. For example, external input may be inputted to a device executing the binary code via a terminal, thereby affecting the execution of a propagation path of the terminal in the binary code.

In some exemplary embodiments, based on identified exploitable propagation paths in the binary code, one or more corresponding code patches associated with a functionality of the binary code may be defined, located, determined, or the like, in the binary code. In some exemplary embodiments, a code patch may be associated with an exploitable propagation path of a terminal, e.g., containing one or more portions thereof, containing code associated with the terminal, or the like. In some exemplary embodiments, a code patch may be defined to include at least one vulnerable code portion that can be manipulated by external input, along with one or more supplement portions that may be necessary for independent execution of the code portion. In some exemplary embodiments, each code portion may be characterized by its terminal interface, e.g., its inputs and outputs, by its internal functionalities, e.g., identified by influences of internal terminals, by internal data propagation paths, or the like. In some exemplary embodiments, a code patch may be located based on having one or more terminals, attributes, or characterizations that match a pattern of interest, e.g., comprising an interface configuration that is considered to be vulnerable, internal operations that match a vulnerable pattern, a combination thereof, or the like.

In some exemplary embodiments, the code patch may cross through different code hierarchy levels, e.g., by containing portions of code units from different hierarchy levels. In some exemplary embodiments, the code patch may comprise one or more first code elements from a first code unit associated with a first hierarchy level of the binary code, one or more second code elements from a second code unit associated with a second hierarchy level of the binary code that is different than the first hierarchy level, or the like. In some cases, the code patch may not necessarily include entire code units, e.g., the code patch may exclude a third code element of the first code unit. In some exemplary embodiments, a code unit may refer to a function. In such cases, the first code unit may include a first function, and the second code unit may include a second function. In some exemplary embodiments, the code patch may comprise at least two portions of two separate functions of the binary code. In some exemplary embodiments, a code unit may refer to a code file. In such cases, the first code unit may include a first code file, and the second code unit may include a second code file. In some exemplary embodiments, the code patch may comprise at least two portions of two separate files or units of the binary code. In some exemplary embodiments, any other type of code unit may be defined, used, or the like.

In some exemplary embodiments, upon identifying a code patch, the code patch may be extracted from the binary code for the purpose of testing thereof, such as using fuzz-testing. In some exemplary embodiments, the code patch may be emulated and tested independently from the binary code. In some exemplary embodiments, an emulation of the code patch may be generated to enable fuzz testing of the emulation, whereby each code patch is tested independently, separately, or the like. In some exemplary embodiments, a test harness for an emulation may be generated based on the characterization of the terminals within the code patch, a characterization of the terminal interface, a detected vulnerable pattern, or the like. In some exemplary embodiments, generating the test harness may include performing one or more memory allocations for execution of the emulation, loading one or more libraries that are utilized by the extracted code patch, defining success and failure outcomes, or the like.

One technical effect of utilizing the disclosed subject matter is locating in binary code complex vulnerabilities, e.g., based on a combination of static analysis and dynamic fuzzing of the code. In some exemplary embodiments, in contrary to generating an emulation for the entire code, which may not be feasible, testing each code patch independently according to selected functionalities may provide an enhanced testing solution, e.g., which may be performed automatically, semi-automatically, or the like. In some exemplary embodiments, separately fuzzing internal code patches in binaries may provide an enhanced embedded code testing, enabling to test potentially vulnerable user input processing algorithms.

Another technical effect of utilizing the disclosed subject matter is enabling detection of embedded code vulnerabilities without having access to the embedded code's source code, e.g., as the source code may be unavailable, difficult to obtain, or the like. In some exemplary embodiments, this may be the case for various reasons, such as due to the source code being proprietary, including a trade secret or other secret algorithms, or the like.

Yet another technical effect of utilizing the disclosed subject matter is focusing on sections of the binary that are potentially vulnerable, e.g., without having access to the source code. In some exemplary embodiments, the disclosed subject matter enables to characterize the binary's functionalities and identify code sections of interest that are difficult to reach or test otherwise.

Yet another technical effect of utilizing the disclosed subject matter is using fuzzing techniques to test embedded code without having access to the hardware it is configured to run on. In some exemplary embodiments, the disclosed subject matter enables to simplify fuzzing of complex protocols by directly executing and testing code sections with well-defined interfaces that are difficult to reach in the usual user input processing flow. In some exemplary embodiments, the ability to test selected code without having access to the hardware on which it is meant to run enables to find vulnerabilities in embedded systems which are otherwise very hard to simulate without having an exact simulator of the underlying hardware including non-volatile storage and peripherals, e.g., such as vulnerabilities that were not detected by a manufacturer.

Referring now to FIG. 1 showing a flowchart diagram of a method, in accordance with some exemplary embodiments of the disclosed subject matter.

On Step 110, during a static analysis of a binary, terminals may be mapped according to data propagation paths, or influences, between one or more terminals. In some exemplary embodiments, the binary code of the embedded device may be automatically analyzed, e.g., coarsely, to identify or detect therein a plurality of terminals, variables, or the like. In some exemplary embodiments, the terminals may include locations of interest, information sources, sinks, or the like, in the context of the code region, or the like.

In some exemplary embodiments, influences between one or more terminals may be mapped, thereby identifying their propagation paths. In some exemplary embodiments, an influence between two terminals may indicate whether or not data is provided from one terminal to the other, e.g., via one or more dereference operations, directly, or the like. In some exemplary embodiments, accessing a value in a memory address that is pointed to by a terminal may be referred to as dereferencing the terminal. In some exemplary embodiments, an influence between a terminal and a variable or memory location relevant to the terminal's function, which are potentially other terminals, may be defined as existing in case a value at the terminal propagates to the variable or memory location. In some exemplary embodiments, each influence between an influencing terminal and an influenced terminal may indicate a change of a first value that is associated to the influenced terminal by a second value that is associated with the influencing terminal. In some exemplary embodiments, mapping influences of the terminals and identifying their propagation paths may enable to characterize the terminals' roles, identify code portions of interest based on the terminals' characterizations, or the like.

In some exemplary embodiments, in order to obtain an influence map of terminals indicating an influence between terminals, influences of each function's terminals that propagate on variables or memory locations may be determined. In some exemplary embodiments, influences of terminals on variables or memory locations that are defined as terminals, may be retained, stored, kept, or the like, as part of the influence map, In some exemplary embodiments, in order to generate the influence map, influence relations between terminals may be calculated, e.g., function by function, or in any other order. In some exemplary embodiments, the binary may be sectioned into its functions, e.g., using one or more automatic processing techniques. In some exemplary embodiments, for each function, a list of terminals contained in the function may be identified and generated.

In some exemplary embodiments, influences of terminals may be determined in a hierarchal manner, or in any other manner. In some exemplary embodiments, when using a hierarchal scheme, influences of terminals may be calculated starting from internal functions and continuing to higher hierarchal function levels. In some exemplary embodiments, influences may be first calculated for terminals within each function, and then continuing to higher hierarchal levels to identify external functions that are related thereto. In some exemplary embodiments, terminals of each function may be mapped with terminals relevant to the function such as terminals of a calling function. For example, a first function may be mapped according to its internal terminals, and then its terminals may be mapped to a second function calling the first function, and so on. In other exemplary embodiments, any other order or manner of mapping terminal influences may be utilized. For example, external functions may be analyzed before internal functions.

In some exemplary embodiments, an external function, e.g., a calling function calling an internal function, the influence map may be calculated by finding the influences within each function and between the functions' terminals. In case the influences between the terminals of the internal function have been calculated before calculating the influences of the calling function, the prior calculation made on the called function may be used without repeating the influence calculations of the called function again. In some exemplary embodiments, the known influences in the internal function may be used without re-analyzing the internal function, thereby enabling to iteratively build analysis of complex code sections efficiently. This way, large code regions may be analyzed and mapped according to identified influences between terminals, while saving computational efforts and time as the called function need not be analyzed each time it is called for influences between its terminals.

Figure 2:
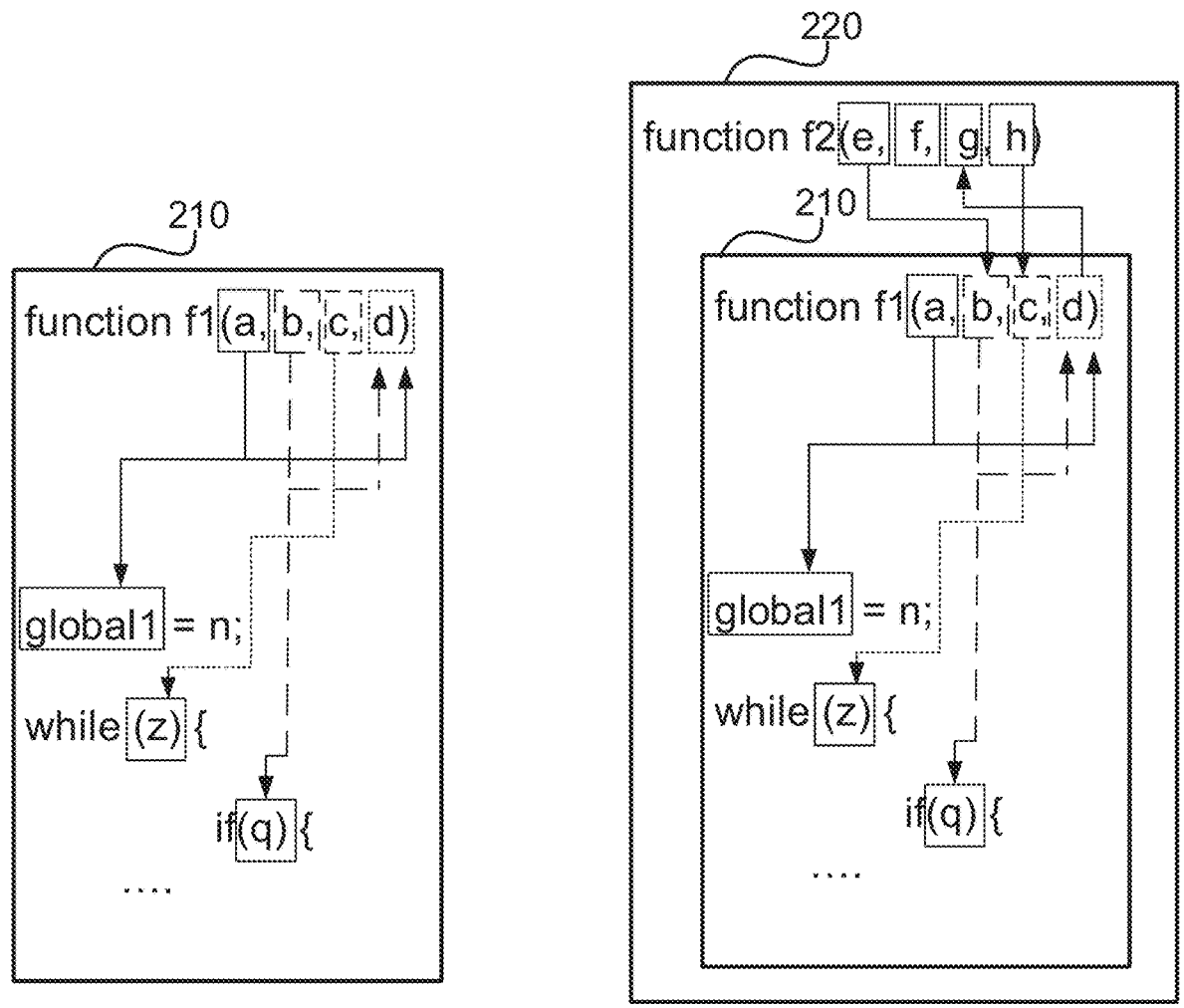
FIG. 2 illustrates a schematic illustration of an exemplary terminal mapping scenario, in accordance with some exemplary embodiments of the disclosed subject matter.

Referring now to FIG. 2 showing a schematic illustration of an exemplary terminal mapping scenario, in accordance with some exemplary embodiments of the disclosed subject matter.

In some exemplary embodiments, terminals of Function 210 may be identified within Function 210. In some exemplary embodiments, in this case, the terminals may comprise input arguments that are inputted to the function (a, b, c, d), a global variable (global1), an internal variable (n), and control conditions (z and q). In some exemplary embodiments, any other additional or alternative terminals may be identified.

In some exemplary embodiments, influences between the identified terminals may be calculated, e.g., based on dereference operations between them. As illustrated in FIG. 2, in the exemplary scenario, it is identified that terminal a influences terminals global1 and d; terminals b influences terminal q; terminal c influences terminal z, or the like. In some exemplary embodiments, any other additional or alternative influence may be identified.

In some exemplary embodiments, after mapping the influences between the terminals of Function 210, the terminals may be mapped to a Function 220 calling Function 210. In some exemplary embodiments, Function 220 may be at a higher hierarchal level compared to Function 210. In some exemplary embodiments, terminals of Function 220 may be identified, e.g., to include the input arguments of Function 220 (e, f, g, h), as well as the terminals of Function 210. In some exemplary embodiments, the terminals of Function 220 may be mapped. In some exemplary embodiments, when mapping the terminals of Function 220, the existing mapping of Function 210 may be utilized without being recalculated. In some exemplary embodiments, the new terminals of Function 220, e.g., arguments e, f, g, h, may be mapped to the corresponding input arguments of Function 210, e.g., a, b, c, and d, without calculating additional mapping between Function 210's internal terminals. In some exemplary embodiments, the influences of the input arguments of Function 210 may be used for determining the influences of Function 220's input arguments' influences.

Referring back to FIG. 1, On Step 120, one or more exploitable propagation paths of terminals may be identified. In some exemplary embodiments, exploitable propagation paths may include propagation paths or portions thereof that are associated with problematic terminals, unsafe terminals, insecure terminals, unsafe terminal behavior or functionality, or the like, that may be exploited. In some exemplary embodiments, an exploitable propagation path of a terminal may be determined to be exploitable in case it can be affected by external inputs, e.g., via a device executing the binary. Additionally or alternatively, an exploitable propagation path may be a flow path of a potentially user-controllable data, whereby enabling malicious users to potentially exploit vulnerabilities in the path.

In some exemplary embodiments, one or more terminals of a plurality of terminals within a binary code may be characterized, e.g., based on the influence map. In some exemplary embodiments, a characterization of a terminal may indicate a role of the terminal in the binary code, an attribute of the terminal, or the like. In some exemplary embodiments, the characterization of the terminal may be determined based on influence scores of the terminal in association with one or more other terminals, e.g., as indicated by the influence map describing the data propagating and influences between the terminals. In some exemplary embodiments, the characterization of the terminal may be determined to indicate that the terminal is an input, an output, a condition, an offset of a buffer, or has any other role. In some exemplary embodiments, the role of the terminal may or may not include the type of the terminal. In some exemplary embodiments, terminals may be characterized in any other way or manner.

In some exemplary embodiments, data propagation paths of one or more terminals may be identified according to the influence map of the terminals. In some exemplary embodiments, data propagation paths may comprise an expected execution flow and memory locations that are affected by the data propagation path. In some exemplary embodiments, data propagation paths may be identified for terminals having potentially vulnerable roles, such as terminals obtaining external input. In some exemplary embodiments, data propagation paths may be identified for additional terminals, e.g., having non-vulnerable roles. In some exemplary embodiments, for a plurality of terminals in the binary code, a plurality of corresponding propagation paths within the binary code may be determined, identified, or the like, to describe a propagation of data from one terminal to binary portions, e.g., according to the influence map of the terminals.

In some exemplary embodiments, a functionality representation of the binary may be generated to include one or more data propagation paths of terminals. In some exemplary embodiments, the plurality of propagation paths of terminals may represent or map a reachability of the plurality of terminals. In some exemplary embodiments, a terminal may be considered to reach another terminal, a code area, or the like, that is influenced thereby, directly or indirectly. In some exemplary embodiments, a terminal may be considered to reach a terminal or code area that is not directly influenced thereby, such as a code area that is modified by a second terminal that is influenced by the terminal. In some exemplary embodiments, the functionality representation may indicate the reachability of the terminals. For example, a first terminal may be considered to reach a third terminal in case the first terminal influences a second terminal, and the second terminal influences the third terminal. In some exemplary embodiments, a reachability of a terminal may be determined to identify internal terminals, internal code, or the like, that is affected by the terminal. For example, the terminal may reach various terminals, variables, memory locations, or the like. In some exemplary embodiments, the functionality representation may be analyzed, processed, or the like, to be matched against corresponding vulnerability patterns.

In some exemplary embodiments, one or more exploitable propagation paths of corresponding terminals in the functionality representation may be determined to be potentially affected by external input, e.g., based on a characterization of the terminals, based on attributes of the propagation path, based on the reachability of the terminals, corresponding patterns, or the like. As an example, external input may be inputted to a device executing the binary code, thereby affecting the execution of the binary code. As another example, a terminal that is characterized as having a role of an input terminal may obtain user input and propagates the input to other terminals. Such a terminal may be considered to be a vulnerable or risky terminal, and its propagation path may be considered to be vulnerable as well. As another example, in case a terminal performs an unsafe action, e.g., reads a length of a buffer to ensure sanitation, the terminal may be considered vulnerable and unsafe.

In some exemplary embodiments, exploitable propagation paths of terminals or associated binary portions may be characterized as being logically important, influential, or the like. For example, an input buffer terminal that obtains external data and propagates the data to other memory locations may be considered to be an influential terminal, and its data propagation path may be considered to be a propagation path of interest. In some exemplary embodiments, the propagation path of the terminal may comprise a precise execution flow, and memory locations that are affected by the external data of the input buffer.

In some exemplary embodiments, propagation paths of interest may be identified in case they match one or more patterns of interest, such as patterns of variables, interface terminals, or the like. In some exemplary embodiments, calculating influences of the terminals, e.g., as performed at Step 110, may enable to characterize binary functionality, for example, by identifying roles of terminals, interface configurations, or the like, and comparing them to existing patterns. In some exemplary embodiments, a functionality implemented by the terminal propagation paths may be automatically described, represented, or the like, in order to locate potentially vulnerable patterns of the propagation paths. In some exemplary embodiments, functionality representations may be matched to predetermined patterns or obtained patters of interest, such as input configuration patterns, output configuration patterns, internal function patterns, a combination thereof, or the like. For example, a pattern of a function having two input terminals and one output terminal may be matched against the functionality representations, to identify in the representation a function with the same interface pattern.

In some exemplary embodiments, propagation paths of interest, or any other binary portion of interest, may be identified based on pattern-identifying queries that may be applied to the functionalities representation, such as queries that describe interface configurations of a function that is associated with functionalities of interest. For example, in order to identify a command injection vulnerability, a query may search for data that corresponds to a pattern of command injection vulnerabilities, e.g., data that is obtained from an input buffer and used to execute an operating system command. In some exemplary embodiments, propagation paths of interest may cover code sections that are vulnerable to having implementation errors, such as code sections performing input parsing relying on external input, code sections performing protocol or file format parsing of external input, code sections performing decoding of external communications, code sections performing signature verification, or the like.

On Step 130, isolated code patches of the binary that match exploitable propagation paths may be defined, identified, or the like. In some exemplary embodiments, at least some portions of a propagation path of a terminal that can be manipulated by external parties, such as by a device on which the binary is executed, may be defined as part of one or more code patches. In some exemplary embodiments, the code patches may be located in the binary code. In some exemplary embodiments, the code patches may comprise at least a portion of an exploitable propagation path, as well as supplement code parts such as global variables that are defined externally to the exploitable propagation path but are used thereby, or any other code portion that is necessary for independent execution of the code patch.

In some exemplary embodiments, one or more code patches matching the propagation paths of interest of the terminal may be defined. In some exemplary embodiments, the code patches may correspond to areas of interest that are vulnerable such as areas that deal with external packets, and therefore can be manipulated by an external party providing the packet, areas that modify a memory, or the like. In some exemplary embodiments, the code patches may be selected in case they are determined to be associated with exploitable propagation paths that comprise potentially vulnerable functionalities, complex functionalities, or the like. In some exemplary embodiments, the code patches may be selected in case they include a functionality that is complex enough to create a bug, a vulnerability, or the like. For example, a code patch that is configured to paste an external packet to internal memory, may be classified as potentially vulnerable.

In some exemplary embodiments, each code patch may comprise one or more portions of code units, that may or may not propagate over different hierarchical levels of functions. In some exemplary embodiments, hierarchical levels may refer to a hierarchical architecture or order of the functions of the binary, that may specify the root function and the sub function layers beneath it. In some exemplary embodiments, the binary may include functions that are organized hierarchically, where internal functions may be considered to be on a lower hierarchical level than external functions calling or using the internal functions. In some exemplary embodiments, the code patches may comprise non-hierarchical code portions propagating over different hierarchical levels. In some exemplary embodiments, instead of separating the binary to hierarchal portions such as to separate functions, to separate files, or the like, the binary may be disassembled to non-hierarchical code patches that may include one or more parts of functions, one or more part of separate files, or the like.

In some exemplary embodiments, a code patch that is not hierarchal may comprise, e.g., one or more first code elements from a first code unit associated with a first hierarchy level of the binary code, and one or more second code elements from a second code unit associated with a second hierarchy level of the binary code. For example, the code patch may include a first portion of a calling function, and a second portion of an internal function that is called by the calling function. In some exemplary embodiments, a code patch that is not hierarchal may comprise, e.g., a first portion of a first code unit and a second portion of a second code unit, excluding a third portion of the first code unit. For example, the first code unit may include a first function, and the second code unit may include a second function. In some exemplary embodiments, in such cases, the code patch may comprise at least two portions of two separate functions of the binary code, that potentially exclude a portion of the first function. As another example, the first code unit may include a first code file of the binary, and the second code unit may include a second code file of the binary. In such cases, the code patch may comprise at least two portions of two separate files of the binary code, potentially excluding a part of the first file.

In some exemplary embodiments, code patches that represent a functionality that is vulnerable, may be selected for extraction. In some exemplary embodiments, the code patches providing the functionality of interest may be extracted from one or more files, functions, or the like, of the binary. In some exemplary embodiments, the code patches may be examined to identify whether they are independent or depend on external factors, whether they call functions external thereto, or the like. In case a code patch utilizes external code, such as external variables, parameters, or the like, the external portions may be added to the code patch regardless of the hierarchical level of the external factors.

On Step 140, emulations of extracted code patches may be generated independently from the binary, e.g., as part of a dynamic analysis. In some exemplary embodiments, each code patch of the binary may be separately emulated and fuzz tested. In some exemplary embodiments, the code patches, even when combined, may or may not cover the entire binary, or the like. In some exemplary embodiments, in order to generate an emulation for a code patch, the code patch may be analyzed to identify execution requirements of the code patch, such as expected memory structures that are utilized by the code patch, expected memory content, variables, location of user input, required buffers, variable types, interface configurations, or the like.

In some exemplary embodiments, the code patches may comprise one or more functionalities of the binary code, e.g., corresponding to one or more vulnerable patterns of functionality representations. In some exemplary embodiments, the code patches' tested functionality may be characterized in terms of its required code, its input configuration, or the like, which may be used to emulate the code patch. In some exemplary embodiments, the required values, types of values, memory allocations, or the like, for terminals of the code patch may be determined by statically analyzing a usage of the terminals in the binary, e.g., using the functionality representations, the influence map, the reachability of the terminals, or the like. In some exemplary embodiments, the vulnerable patterns identified for a code patch may be utilized for characterizing and emulating the code patch. In some exemplary embodiments, possible outcomes or results regarding the functionality that is tested may be defined prior to generating the emulation, e.g., based on the identified vulnerable patterns, a terminal interface, the functionality representations of the code patch, or the like.

In some exemplary embodiments, each possible outcome may be determined to be associated with implications of the testing. In some exemplary embodiments, potential failures or crashes occurring during the testing may be classified as being merely crashes of the emulation, e.g., occurring due to a malformed emulation, or as being actual failures of the binary, e.g., indicating binary vulnerabilities. In some exemplary embodiments, crashes that occur regardless of the input to the emulation may indicate a malformed emulation, while crashes that occur for certain types of input may indicate an implementation error of the binary itself. In some exemplary embodiments, failures of the binary may be indicated by potential crashes, e.g., in case a crash is classified as being an actual failure of the binary, in case a crash occurs only for certain input, or the like. In some exemplary embodiments, failures of the binary may be indicated by one or more defined logical conditions. For example, a defined condition of providing invalid file paths to file access commands, may indicate adversarial behavior exploiting a binary vulnerability. In some exemplary embodiments, failures of the binary may be indicated by any other signal, condition, event, or the like.

In some exemplary embodiments, as IoT or embedded devices may not typically include a user interface, an all-purpose processor, or the like, it may not be beneficial to emulate at once the entire binary, e.g., although emulations are typically generated for an entire software. In some exemplary embodiments, by independently generating an emulation for each code patch, the code patches may be successfully emulated and fuzz tested. In some exemplary embodiments, separately fuzzing of code patches of internal code may provide an enhanced embedded code testing, enabling to test and process potentially vulnerable user input.

On Step 150, a generated emulation of a code patch may be fuzz tested, separately from the rest of the binary, in attempt to detect vulnerabilities of the code patch. In some exemplary embodiments, each extracted code patch may represent internal isolated functionalities in the binary that are to be fuzzed separately. In some exemplary embodiments, each generated emulation may be fuzz tested, e.g., using one or more fuzzing techniques. Alternatively, any other testing technique may be used. In some exemplary embodiments, a greybox fuzzing such as an AFL™ fuzzer or any other fuzzer may be executed in order to supply inputs to the emulation, track its execution flow, report when it detects crashes, or the like.

In some exemplary embodiments, deep analysis of the code patches' functionalities may be performed by testing their emulations, thereby potentially detecting non-trivial or exploitable vulnerabilities of the binary. In some exemplary embodiments, fuzzing may be performed for selected code patches, while each code patch may be fuzz tested according to its own independent characterization, configuration requirements, interface terminals, or the like.

In some exemplary embodiments, generating a runtime environment for testing may include allocating memory to variables, pasting the code of the code patch, loading values, preparing the memory space, or the like. In some exemplary embodiments, a fuzz engine may utilize data from detected patterns of code patches for fuzz testing. Additionally, fixed values of the code patches may be provided to the fuzzer based on identified fixed variables in the binary.

In some exemplary embodiments, various fuzzing techniques, typically applied to test a known interface of a complete program, may be used to test the code patches representing isolated internal functionalities in the binary. In some exemplary embodiments, the embedded code may be fuzz tested without access to the actual hardware it runs on, to a source code, or the like. In some exemplary embodiments, testing the code patches individually may simplify fuzzing of complex protocols and enable to directly run code sections that may be challenging to reach in a usual user input processing flow.

Figure 3:
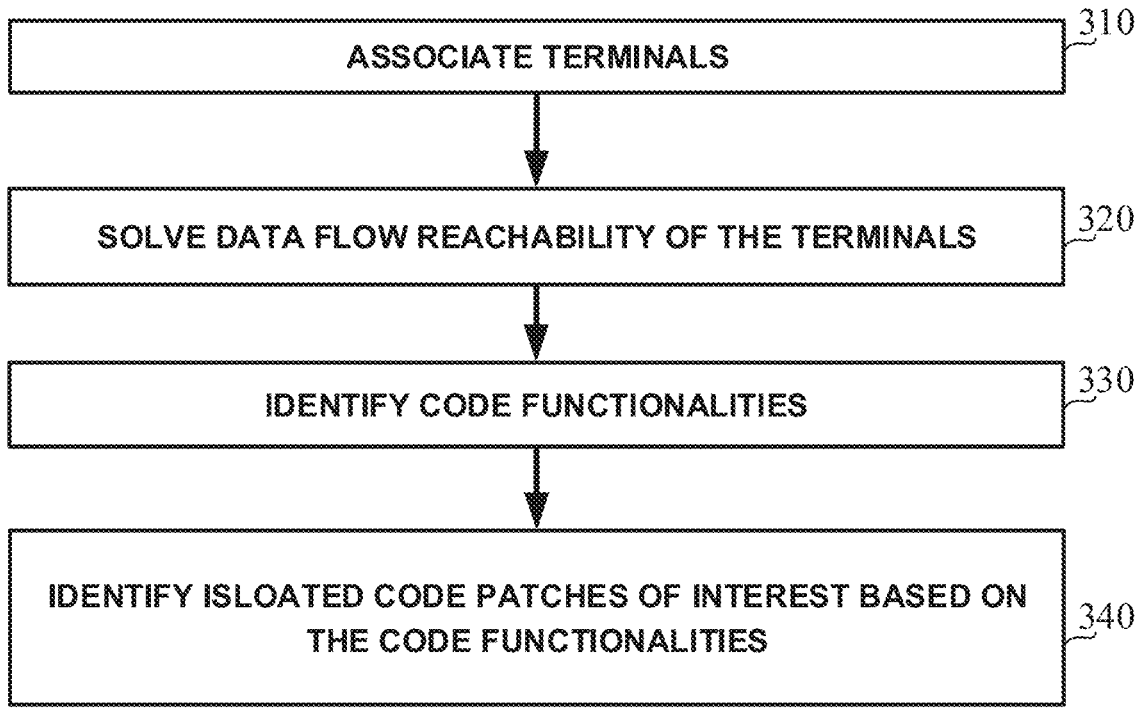
FIG. 3 illustrates a flowchart diagram of a method of static analysis, in accordance with some exemplary embodiments of the disclosed subject matter.

Referring now to FIG. 3 showing a flowchart diagram of a method of static analysis, in accordance with some exemplary embodiments of the disclosed subject matter.

In some exemplary embodiments, Steps 310-340 may be performed as part of a static analysis phase which may be configured to analyze of the binary to identify therein code patches of interest.

On Step 310, terminals of a binary code may be associated, mapped with each other, or the like, e.g., based on an influence between the terminals. In some exemplary embodiments, an influence map may be generated to indicate influences between terminals. In some exemplary embodiments, for each function in the binary, the influence map may indicate an influence each of the function's terminals with respect to each other or with respect to external terminals relevant to the function, utilizing the function or portion thereof, or the like. In some exemplary embodiments, an influence between two terminals may indicate whether or not data is provided from one terminal to the other, directly or via one or more dereference operations in corresponding dereference levels. In some exemplary embodiments, accessing a value in a memory address that is pointed to by a terminal may be referred to as dereferencing the terminal.

In some exemplary embodiments, as many memory addresses may point to each other, each additional pointer in the way may be considered as an additional dereference level. For example, a direct value propagating from a terminal may be considered the lowest dereference level of the terminal, e.g., level 0, a value in a memory address that is pointed to by the terminal may be considered the next dereference level of the terminal, e.g., level 1, a value in a memory address that is pointed to by a memory address that is pointed to by the terminal may be considered the next dereference level of the terminal, e.g., level 2, and so on. In some exemplary embodiments, a level of dereference of a terminal may indicate a level of indirectness of the terminal's influence. In some exemplary embodiments, any other number or cue may be assigned to represent different dereference levels.

In some exemplary embodiments, dereference levels may be calculated between terminal pairs, e.g., indicating a type of influence between a terminal pair. In some exemplary embodiments, in case no dereference operation occurs on a path between a source terminal, denoted $deref_{src}$, and a destination terminal, denoted $deref_{dst}$, and a value is directly passed between the terminals, it may be determined that $deref_{src} = deref_{dst} = 0$. In some exemplary embodiments, in case a value does not pass at all between terminals, it may be determined that the terminals have no influence on each other and have no dereference operation, e.g., not even a dereference value of 0. In some exemplary embodiments, a dereference between a terminal and a variable in case a value stored in the memory pointed at by the value of the terminal propagates to the variable may be denoted as $deref_{src}=1$, $deref_{dst}=0$. In some exemplary embodiments, multiple dereference operations may exist for the destination variable, e.g., in case a value pointed to by an address that is pointed to by the destination variable is changed by the source terminal, which may be denoted as $deref_{dst}=2$, or the like. In some exemplary embodiments, any other number of dereference operations may exist for the source terminal, the destination terminal, or the like.

In some exemplary embodiments, mapping the terminals according to their dereference operations may be challenging for embedded binary that lacks source code. In some exemplary embodiments, in some cases the embedded device's binary may comprise native binary code only, without having access or knowledge of the source code. In some exemplary embodiments, as there may be no access to the source code, intermediate conversion may be performed to convert the native binary to an intermediate representation. In some exemplary embodiments, the binary code may be translated to a high-level representation. In some exemplary embodiments, the translating may include sectioning the binary code into functions and lifting the code to an intermediate representation such as to GHIDRA™'s P-Code, e.g., using one or more conversion tools such as a GHIDRA™ tool. In some exemplary embodiments, upon obtaining the intermediate representation, the code may be analyzed function by function. In some exemplary embodiments, in case the source code is available, the source code may be analyzed instead.

In some exemplary embodiments, the binary may be mapped function by function, to identify influence relationship of each function's terminals with relevant terminals such as with each other, with terminals from related functions, or the like. In some exemplary embodiments, after the analysis of the influences of the functions, the influence map may include only variables or memory locations that are defined as terminals. In some exemplary embodiments, for all possible pairs of terminals, the required dereference levels to pass data between them may be stored. e.g., as follows:

$$(T_{in}, T_{out}) \rightarrow \begin{cases} \text{None} \\ (deref_{src}, deref_{dst}) \end{cases} \quad (1)$$

In some exemplary embodiments, None may indicate that there is no influence between the terminals $T_{in}$ and $T_{out}$, e.g., which may be the typical case.

In some exemplary embodiments, dereference operations for accessing and storing the data between the terminals may be calculated, e.g., for each terminal. In some exemplary embodiments, a dereference level between two terminal may be denoted as an ($T_{in}$, $T_{out}$) value couple, wherein $T_{in}$ (the left value) relates to the source terminal and $T_{out}$ (the right value) relates to the destination terminal. In some exemplary embodiments, $T_{in}$ may denote a number of dereference levels of a source terminal ($T_{in}$) that propagates a data value to a target terminal, while $T_{out}$ may denote a number of dereference levels of the target terminal ($T_{out}$) to which the data is propagated. For example, an influence between first and second terminals may be denoted as (0,0) in case a value of the first terminal is directly copied to the second terminal. As another example, a value that is copied from a first terminal to an address that is pointed to by a second terminal may have a dereference level between the first and second terminals that is denoted by (0,1), e.g., indicating no dereference of the first terminal, and a first level of dereference of the second terminal. As yet another example, a value that is copied from an address pointed to by first terminal to an address that is pointed to by a second terminal may have a dereference level between the first and second terminals that is denoted by (1,1), e.g., indicating a first dereference level of the first terminal, and a first level of dereference of the second terminal. As another example, a value that is copied from a first terminal to a second address that is pointed to by an address that is pointed to by a second terminal may have a dereference level between the first and second terminals that is denoted by (0,2).

On Step 320, data flow reachability of terminals may be solved. In some exemplary embodiments, an influence relationship between two terminals may indicate an existence of data propagation paths. In some exemplary embodiments, for a plurality of terminals in the binary code, a plurality of corresponding propagation paths within the binary code may be determined, identified, or the like, e.g., according to the influence map of the terminals. In some exemplary embodiments, propagation paths may comprise a propagation of data between terminals. For example, propagation paths may indicate content passing from one terminal to the next via one or more memory location, content passing from addresses that are pointed to by a terminal to a next terminal, or the like.

In some exemplary embodiments, the propagation paths may indicate a reachability of the plurality of terminals within the binary code. In some exemplary embodiments, a terminal may be considered to reach a code area that is influenced thereby, directly or indirectly. In some exemplary embodiments, a terminal may be considered to reach a code area that is not directly influenced thereby, such as a code area that is modified by a second terminal that is influenced by the terminal. In some exemplary embodiments, a reachability of a terminal may be determined to identify internal code that is affected by the terminal such as other terminals, variables, memory locations, or the like.

In some exemplary embodiments, a reachability path of a terminal may comprise a precise execution flow of the terminal and memory locations that are affected by the execution flow. In some exemplary embodiments, a reachability of a terminal may identify code that is affected by the terminal such as other terminals, a hierarchal level to which the terminal propagates, variables to which the terminal propagates, memory locations to which the terminal propagates, or the like.

In some exemplary embodiments, a reachability of a terminal through a propagation path may be verified to ensure that the path does not undergo sanitation stages, defensive programming stages, or the like. In some exemplary embodiments, data entering a propagation path may be verified to propagate, in a manipulated or original version, to an end of the propagation path, without being blocked by deployed defensive programming, sanitation, or the like.

On Step 330, code functionalities of the binary may be identified, e.g., based on the data flow reachability. In some exemplary embodiments, a functionality representation of terminals according to their influences, propagations, or the like, may be generated as terminal graphs, maps, descriptions, representations, or the like, and may be analyzed to identify matching patterns of interest such as vulnerable patterns. In some exemplary embodiments, a high-level functional understanding may be derived from the functionality representation, enabling to obtain or generate high-level descriptions or indications of a binary. In some exemplary embodiments, the calculated influences of the terminals and their reachability may enable to automatically obtain the functionality representation of a functionality implemented by each code portion of the binary.

In some exemplary embodiments, based on the functionality representation, the terminals may be characterized. In some exemplary embodiments, a characterization of a terminal of a plurality of terminals within a binary code may be determined, e.g., to indicate a role of the terminal in the binary code. In some exemplary embodiments, terminals may be characterized as being functionally or logically important, influential, or the like. In some exemplary embodiments, a terminal may be characterized as having a certain role in the binary such as being an input variables, e.g., in case the terminal only influences other terminals without being influenced by the other terminals. In some exemplary embodiments, a terminal may be characterized as having a certain role in the binary such as being an output variable, e.g., in case the terminal is only influenced by other terminals without influencing any other terminals. In some exemplary embodiments, a terminal may be characterized by matching the functionality representation of a portion associated with the terminal, with one or more patterns. Additionally or alternatively, a terminal may be characterized in any other way, based on any identified property or pattern, e.g., automatically, semi-automatically, manually, or the like.

In some exemplary embodiments, code portions may be characterized according an amount or type of inputs that can be handled thereby, according to their output types, variables, or the like, according to their input argument types, variables, or the like, according to their conditional branches, internal processing, or the like, or the like. In some exemplary embodiments, code portions may be characterized based on a characterization of their terminals, e.g., based on the terminals' types, roles, crashing possibilities, or the like. In some exemplary embodiments, potentially vulnerable terminals may cause a code portion including the terminal to be considered potentially vulnerable as well.

In some exemplary embodiments, one or more queries or searches may be utilized to automatically characterize and describe functionality of the binary code. In some exemplary embodiments, the queries may be configured to identify one or more patterns of a code portion, such as its interface configuration, its parameter types, or the like. In some exemplary embodiments, the queries may be predetermined, automatically generated based on attributes or metadata of the binary, manually inputted by an operator, obtained from a third party, or the like. In some exemplary embodiments, the queries may be applied to, or utilize, the influence map, terminal characterizations, terminal reachability, the binary code, the intermediate representation of the binary code, or the like.

For example, queries may search which variables of a code portion are input variables and which are output variables? Which input variables are information sources of each output variables? Is a function output an immediate value, a buffer, or structures containing buffers? Which variables have side effects, such as providing stored data to global variables or using the stored data in system calls? Which variables affect the control flow of the function? Which output variables depend on the control flow of a function? Which variables control loop conditions? Do the loop conditions depend on the arguments' values or on data stored in a buffer pointed at by the argument? What are the data propagation paths originating from a given source, that span through many functions (intraprocedural Data Flow Analysis)? And so on. In some exemplary embodiments, using the queries, functionalities of the binary may be identified and mapped.

In some exemplary embodiments, in some cases, complex pattern identifying queries may be used to identify patterns associated with functionalities and vulnerabilities of the binary. For example, in order to identify a suspected stack overflow, a complex query may be defined, e.g., to search in the influence map for an influence between an output terminal of a function producing user input (e.g., in a function such as recv( ) or read( ) of one or more programming languages supporting the Portable Operating System Interface (POSIX™) standard) and a source terminal of an unsafe string manipulation function, while simultaneously searching for influence between a stack variable in the call stack and the destination terminal. In some exemplary embodiments, a representation of a code's functionality may be formulated based on query results.

In some exemplary embodiments, generated coarse-grained descriptions of functionalities may be retained in a database, a repository, shared with a third party, or the like. In some exemplary embodiments, the functionality description may be used as a compiler-independent logical feature, in order to locate similar functions in a library of known functions. In some exemplary embodiments, the functionality descriptions may be used in a binary matching between unknown binary code and known libraries. In some exemplary embodiments, the functionality descriptions may be used in a matching between unknown binary code and inter- or intra-procedural control flow graphs, function data, or the like. In some exemplary embodiments, using such matching, potentially vulnerable functionalities, such as for example incoming message analysis functions, string manipulation functions, or the like, may be identified without access to their source code and based on the coarse-grained description. Such functionalities may be considered as potentially vulnerable and may be considered suitable candidates for fuzz testing.

On Step 340, isolated code patches having functionalities of interest may be identified, e.g., based on the detected functionalities in the binary. In some exemplary embodiments, based on the functionality descriptions, potentially vulnerable patterns may be used to detect propagation paths or code patches that are potentially vulnerable. In some exemplary embodiments, the potentially vulnerable patterns may be predetermined, determined, obtained from a third party, or the like.

In some exemplary embodiments, code patches associated with a functionality of interest of the binary may be defined, located in the binary and characterized. In some exemplary embodiments, each code patch may include one or more code blocks composed of one or many functions, portions thereof, or the like. In some exemplary embodiments, each code patch may have a well-defined interface including a set of terminals, which may be characterized to enable emulation thereof. As an example, an interface of a code patch may be characterized as having one input buffer, one output buffer, and one input length variable.

In some exemplary embodiments, the characterization of code patches as vulnerable may be performed using queries relating to vulnerable patterns, e.g., automatically or manually. In some exemplary embodiments, complex vulnerabilities may be located in binary code by locating isolated logical patches therein that match a vulnerable pattern. In some exemplary embodiments, the queries may utilize the functionality descriptions to obtain results, or any other source such as the influence map. For example, a vulnerable pattern may include an input from two terminals that arrives at a third terminal, and data blocks that match this pattern may be detected. In some exemplary embodiments, the vulnerable patterns may be compared with functionality descriptions to identify whether or not they match. In some exemplary embodiments, code patches that perform a complex task and may contain implementation errors may be located. For example, according to the functionality descriptions, a complex task comprising parsing of communication protocol buffers or file formats, performing signature verification, or the like, may be identified.

In some exemplary embodiments, potentially vulnerable isolated functionality may be automatically located in association with a data flow path of a potentially user-controllable data. In some exemplary embodiments, a code patch including the functionality that can approximately be isolated from the rest of the binary code may be determined, e.g., by automatically characterizing a limited set of interfaces on which the functionality and the rest of the code communicate. In some exemplary embodiments, code patches may be characterized to have a certain interface, such as having one input buffer, one output buffer, and one input length variable. In some exemplary embodiments, an input buffer of the interface may be verified to be on a data flow path from a user input receiving function, so that it could be vulnerable to user-provided input.

In some exemplary embodiments, a resulting cluster of functions and interfaces may be considered to be an independent functionality in the code, which may be evaluated separately from remaining binary code. In some exemplary embodiments, a code patch may be considered to be independent or isolated in case it comprises a cluster of one or more functions or portions thereof that call only other functions from the same cluster and whitelisted system APIs. In some exemplary embodiments, an isolated code portion may be generated, defined or created by combining one or more functionality patches of interest along with supplement code portions that are required for independently executing the functionality patches. In some exemplary embodiments, in case the terminals of a functionality are arguments of a single function, the cluster may include a union of bodies of all functions in the call graph starting with the single function. In some exemplary embodiments, each isolated code portion providing a functionality of interest may be selected for extraction and may be emulated separately, independently, or the like.

Figure 4:
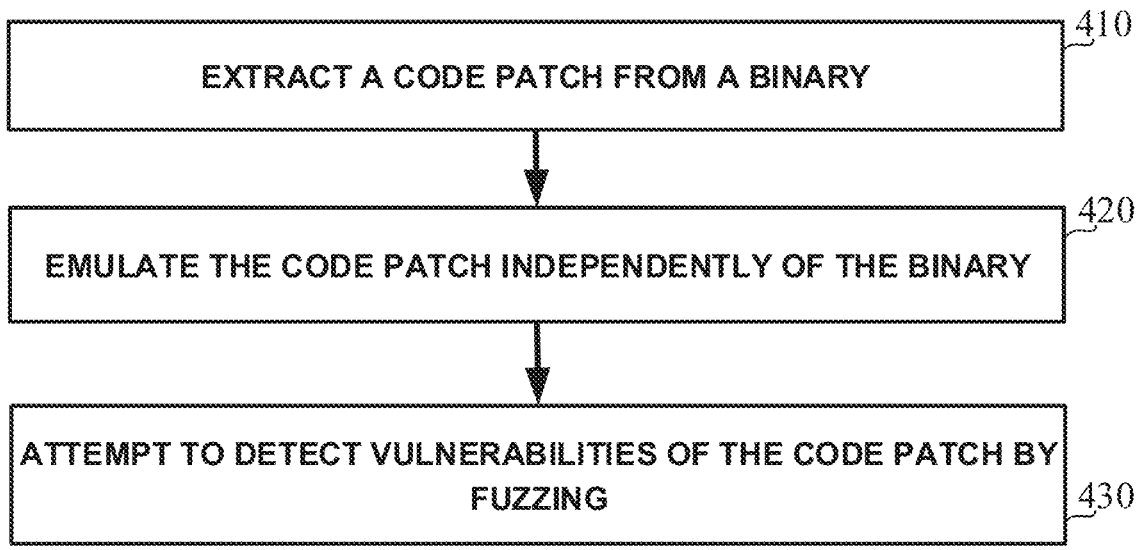
FIG. 4 illustrates a flowchart diagram of a method of dynamic analysis, in accordance with some exemplary embodiments of the disclosed subject matter.

Referring now to FIG. 4 showing a flowchart diagram of a method of dynamic analysis, in accordance with some exemplary embodiments of the disclosed subject matter.

In some exemplary embodiments, Steps 410-430 may be performed as part of a dynamic analysis phase which may be configured to generate emulations of code patches and to perform fuzz testing of the patches.

On Step 410, one or more selected isolated code patches may be extracted from the binary. In some exemplary embodiments, the isolated code patches may comprise code portions that have a well-defined interface of input terminal, output terminals, or the like. In some exemplary embodiments, the isolated code patches may comprise an extracted cluster of one or more functions or portions of the binary that call only other functions from the same cluster and whitelisted system APIs.

On Step 420, the code patches may be emulated separately, independently, or the like, of the binary, of each other, or the like. In some exemplary embodiments, the area in the binary corresponding to the code patches may be located and copied to be executed by the emulator. In some exemplary embodiments, the code to be copied may include an independent code cluster that does not call external portions. For example, in case the terminals of the functionality are arguments of a single function, the required code for the emulation may include a union of bodies of all functions in the call graph starting with the single function.

In some exemplary embodiments, a test harness of the extracted code patch may be constructed for each code patch, e.g., based on the execution requirements. In some exemplary embodiments, a test harness may comprise a collection of software and test data configured to test the code patch by running it under varying conditions and monitoring its behavior and outputs, e.g., using a fuzz test engine and a test script repository. In some exemplary embodiments, a test harness for the emulation may be generated based on the characterization of the code patch, its interface, or the like.

In some exemplary embodiments, generating the test harness may include performing one or more memory allocations for execution of the emulation, loading one or more libraries that are utilized by the extracted code patch, defining success and failure outcomes, or the like. In some exemplary embodiments, the test harness may define a set-up allowing to emulate the code patch. In some exemplary embodiments, in order to emulate a code portion, it may be required to perform a fine grain analysis of the code patch to define valid execution requirements for the emulation. In some exemplary embodiments, execution requirements may comprise values for registers of the variables, a number of registers that are needed, types of inputs that can be used for fuzz testing, or the like. In some exemplary embodiments, the test harness may define a limited set of interfaces on which the extracted code and the rest of the binary communicate, which are to be emulated by the fuzzer.

As an example, in case a terminal of a code patch is characterized as being a user input buffer, the emulation may be required to allocate for the terminal a buffer and input thereto values from the fuzzer as user input. As another example, for a constant variable, the variable needs to be identified and used for the emulation by allocating a corresponding memory with a corresponding value.

In some exemplary embodiments, execution requirements or conditions for emulating a code patch may be defined, e.g., based on vulnerable patterns matching the code patch, a functionality of the code patch, the terminal interface of the code patch, identified valid values for registers of the variables, or the like. In some exemplary embodiments, the execution requirements may be determined based on an analysis of the code patch, an analysis of variables and terminals in the code patch, based on the influence map of the terminals mentioned in the code patch, or the like.

On Step 430, the code patch may be fuzz tested, e.g., in attempt to detect its vulnerabilities, similarly to Step 150 of FIG. 1. In some exemplary embodiments, the fuzz testing may comprise generating inputs for the emulation, e.g., based on the execution requirements, vulnerable patterns matching the code patch, a functionality of the code patch, or the like. For example, a code patch comprising an additive functionality that sums a value of two parameters, may be characterized as such based on its terminal interface and its internal functionality. Based on such a characterization, matching inputs may be generated which may be predefined for the additive functionality. For example, a predefined test for additive functionality may comprise generating large numbers as an input.

In some exemplary embodiments, sanitations may match the fuzzing to the test harness by detecting of termination conditions configured to stop the fuzzing before it crashes. In some exemplary embodiments, the sanitation may be defined in accordance to the purpose of the execution, e.g., by an operator, a user, or the like. In some exemplary embodiments, an evolution of fuzzing and sanitation for stopping the fuzzing may be defined, e.g., based on a characterized functionality of the code patch, a detected vulnerable pattern thereof, or the like. For example, in case a condition is not met, the fuzzing may be configured to be terminated. In some exemplary embodiments, the fuzzer may identify crashes, invalid conditions, or the like, and perform termination of the execution based thereon. For example, a sanitation may prohibit to perform illegal access to the memory, illegal variables, or the like. In some exemplary embodiments, based on the static analysis, patterns may be defined to identify, for example, access of data in a forbidden manner, which may cause the fuzzer to terminate.

In some exemplary embodiments, in case defensive programming was employed, the terminals may be protected by the programming, thereby providing false positive results. In some exemplary embodiments, using defensive programming, testing results may be valid even in case the result is supposed to be invalid due to a bug in the binary. In such cases, vulnerabilities and bugs may be hidden and may not be discovered during testing, e.g., due to autonomous recovery being performed. In some exemplary embodiments, the fuzzer may determine whether a value given to a terminal that caused a crash was not first blocked out of the code due to defensive programming.

Figure 5:
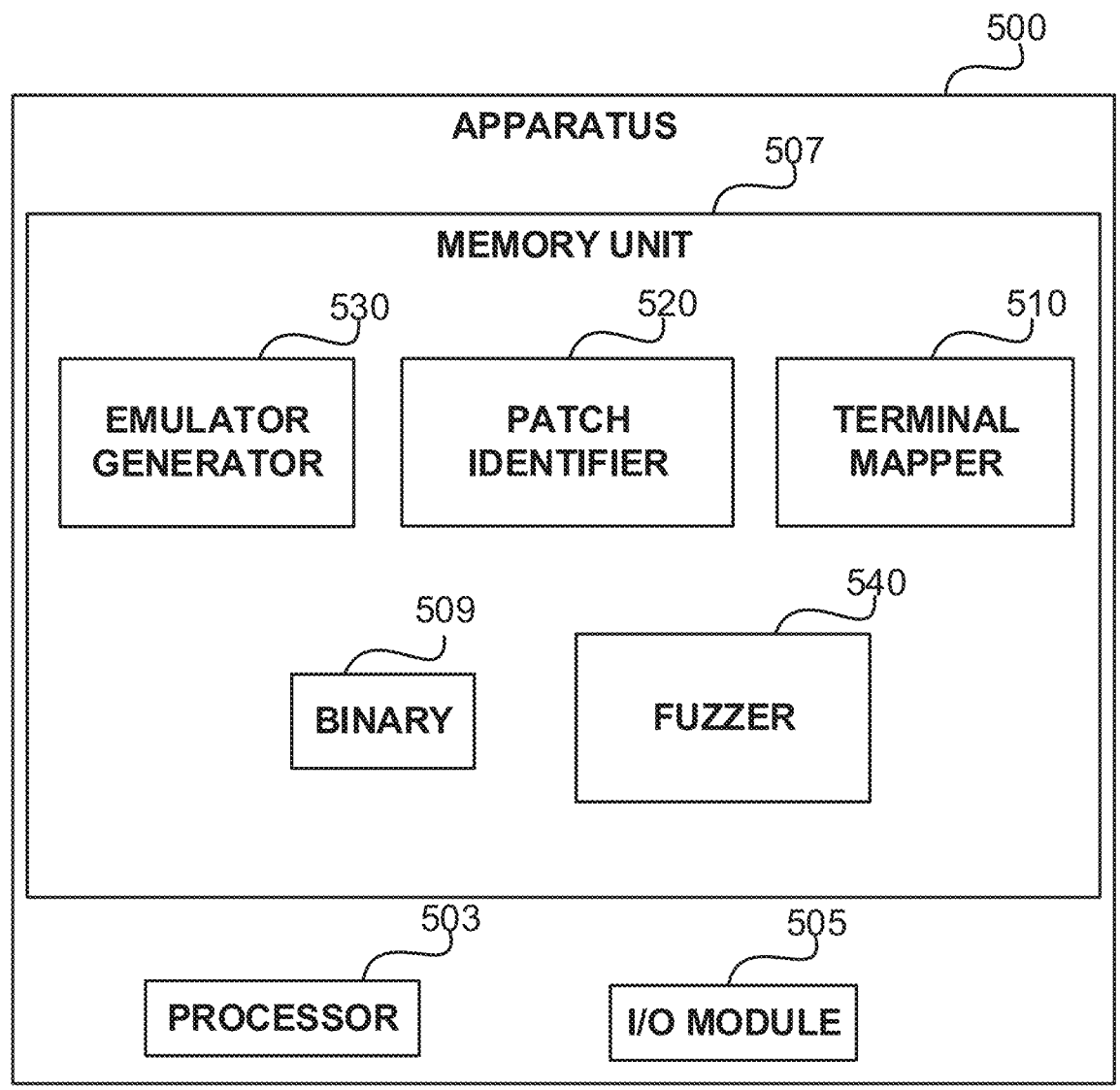
FIG. 5 illustrates a block diagram of an apparatus, in accordance with some exemplary embodiments of the disclosed subject matter.

Referring now to FIG. 5 showing a block diagram of components of an apparatus, in accordance with some exemplary embodiments of the disclosed subject matter.

In some exemplary embodiments, an Apparatus 500 may comprise or be contained in an embedded device. In some exemplary embodiments, Apparatus 500 may comprise a Processor 503. Processor 503 may be a Central Processing Unit (CPU), a microprocessor, an electronic circuit, an Integrated Circuit (IC) or the like. Processor 503 may be utilized to perform computations required by Apparatus 500 or any of its subcomponents. Processor 503 may be configured to execute computer-programs useful in performing the method of FIGS. 1, 3, 4, or the like.

In some exemplary embodiments of the disclosed subject matter, an Input/Output (I/O) Module 505 may be utilized to provide an output to and receive input from a user. I/O Module 505 may be used to transmit and receive information to and from the user or any other apparatus in communication therewith.

In some exemplary embodiments, Apparatus 500 may comprise a Memory Unit 507. Memory Unit 507 may be a short-term storage device or long-term storage device. Memory Unit 507 may be a persistent storage or volatile storage. Memory Unit 507 may be a disk drive, a Flash disk, a Random Access Memory (RAM), a memory chip, or the like. In some exemplary embodiments, Memory Unit 507 may retain program code operative to cause Processor 503 to perform acts associated with any of the subcomponents of Apparatus 500. In some exemplary embodiments, Memory Unit 507 may retain program code operative to cause Processor 503 to perform acts associated with any of the steps in FIGS. 1, 3, 4, or the like.

In some exemplary embodiments, Memory Unit 507 may retain a binary code, e.g., Binary 509. In some exemplary embodiments, Binary 509 may comprise an embedded native code that is desired to be tested, e.g., embedded in an IoT device, an embedded device, a wearable device, or the like, in which Apparatus 500 resides. In some exemplary embodiments, Binary 509 may be a native binary and may not comprise source code, high level code, or the like. Binary 509 may have one or more vulnerabilities, at least one vulnerability not being detected by a manufacturing testing phase.

The components detailed below may be implemented as one or more sets of interrelated computer instructions, executed for example by Processor 503 or by another processor. The components may be arranged as one or more executable files, dynamic libraries, static libraries, methods, functions, services, or the like, programmed in any programming language and under any computing environment.

In some exemplary embodiments, Memory Unit 507 may comprise a Terminal Mapper 510. In some exemplary embodiments, Terminal Mapper 510 may be external to Memory Unit 507, e.g., may reside on a different device from the device housing Apparatus 500, may reside on a server, a network, or the like. In some exemplary embodiments, Terminal Mapper 510 may identify a plurality of terminals in Binary 509. In some exemplary embodiments, Terminal Mapper 510 may identify an influence map of influences between terminal couples. In some exemplary embodiments, Terminal Mapper 510 may map a plurality of terminal couples with each other, e.g., based on an influence between the terminals in one or more dereference operation. In some exemplary embodiments, the plurality of couples may comprise all possible terminal couples or a subset thereof, e.g., a subset including for each function, terminals that are associated with the function. In some exemplary embodiments, an influence between an influencing terminal and an influenced terminal may indicate a change of a first value that is associated to the influenced terminal by a second value that is associated with the influencing terminal.

In some exemplary embodiments, Memory Unit 507 may comprise a Patch Identifier 520. In some exemplary embodiments, Patch Identifier 520 may obtain the influence map from Terminal Mapper 510, and identify based thereon a reachability of one or more of the terminals. In some exemplary embodiments, Patch Identifier 520 may characterize roles of terminals based on the influence map, their reachability, or the like, and identify vulnerable terminals having vulnerable roles. In some exemplary embodiments, Patch Identifier 520 may identify, for each vulnerable terminal, an exploitable propagation paths thereof that correspond to a reachability of the vulnerable terminals.

In some exemplary embodiments, Patch Identifier 520 may identify one or more code patches comprising the exploitable propagation paths. In some exemplary embodiments, each code patch may be associated with one or more of the exploitable propagation paths. In some exemplary embodiments, each code patch that is associated with a propagation path may comprise one or more portions of the propagation path, the entire propagation path, or the like. In some exemplary embodiments, Patch Identifier 520 may define each code patch to comprise isolated portions of Binary 509 that can be emulated separately.

In some exemplary embodiments, Memory Unit 507 may comprise an Emulator Generator 530. In some exemplary embodiments, Emulator Generator 530 may be external to Memory Unit 507, e.g., may reside on a different device from the device housing Apparatus 500, may reside on a server, a network, or the like. In some exemplary embodiments, Emulator Generator 530 may extract the code patch from Binary 509, and identify execution requirements thereof. In some exemplary embodiments, Emulator Generator 530 may generate a test harness defining one or more memory allocations for execution of the emulation, one or more libraries that are utilized by the extracted code patch and are to be loaded, defining success and failure outcomes, or the like. In some exemplary embodiments, Emulator Generator 530 may define required code and input configuration for the emulation, as well as sanitation and execution requirements for the emulation. In some exemplary embodiments, Emulator Generator 530 may generate an emulation of the code patch, according to the test harness.

In some exemplary embodiments, Memory Unit 507 may comprise a Fuzzer 540. In some exemplary embodiments, Fuzzer 540 may be external to Memory Unit 507, e.g., may reside on a different device from the device housing Apparatus 500, may reside on a server, a network, or the like. In some exemplary embodiments, Fuzzer 540 may be configured to fuzz test the emulation, e.g., generated by Emulator Generator 530. In some exemplary embodiments, Fuzzer 540 may utilize the input configuration, the sanitation and the execution requirements defined by Emulator Generator 530, in order to provide relevant inputs. In some exemplary embodiments, Fuzzer 540 may provide inputs to the emulation, and monitor the emulation for exceptions such as crashes, failing built-in code assertions, or potential memory leaks. In some exemplary embodiments, based on Fuzzer 540, one or more vulnerabilities of the code patch may be identified, e.g., difficult to find vulnerabilities that were not identified in the testing phase of Apparatus 500.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining a binary code of an embedded device;
   performing static analysis of the binary code to identify a potentially vulnerable code region, wherein the potentially vulnerable code region is associated with providing input or output from code units of the binary code;
   identifying propagation paths associated with the potentially vulnerable code region in the binary code;
   analyzing the propagation paths to identify a potentially exploitable propagation path, wherein the potentially exploitable propagation path is potentially affected by external input that is inputted to a device executing the binary code;
   determining a code patch associated with the potentially exploitable propagation path;
   performing fuzz testing on the code patch independently from the binary code, whereby detecting vulnerabilities of the code patch; and
   wherein said performing the fuzz testing comprises:
      generating an emulation of the code patch independently from the binary code;
      detecting vulnerabilities of the code patch by fuzz testing the emulation;
   wherein the static analysis comprises:
      determining a characterization of the potentially vulnerable code region based on influences between the potentially vulnerable code region and at least another code region in the binary code, wherein the characterization of the potentially vulnerable code region indicates a role of the potentially vulnerable code region in the binary code;
      based on the characterization of the potentially vulnerable code region, determining that the potentially vulnerable code region is potentially affected by external input that is inputted to the device executing the binary code;
   wherein said identifying the potentially exploitable propagation path comprises:
      determining for the potentially vulnerable code region a corresponding potentially exploitable propagation path within the binary code, wherein the corresponding potentially exploitable propagation path indicates a reachability of the potentially vulnerable code region within the binary code;
      locating in the binary code the code patch, wherein the code patch is associated with a functionality of interest of the binary code, wherein the code patch is associated with the potentially exploitable propagation path of the code region, wherein the code patch comprises the code region, wherein the code patch can be executed independently from the binary code.

2. The method of claim 1, wherein the emulation is generated based on the characterization of the code region indicating the role of the code region in the binary code, wherein the emulation is generated based on influences between the code region and other code regions in the binary code.

3. The method of claim 1 wherein the code patch comprises at least a first code element from a first code unit associated with a first hierarchy level of the binary code and a second code element from a second code unit associated with a second hierarchy level of the binary code, whereby crossing through different code hierarchy levels, wherein the code patch excludes at least a third code element of the first code unit.

4. The method of claim 3, wherein the first code unit is a first function, wherein the second code unit is a second function, whereby the code patch comprises at least two portions of two separate functions of the binary code.

5. The method of claim 3, wherein the first code unit is a first code file, wherein the second code unit is a second code file, whereby the code patch comprises at least two portions of two separate files of the binary code.

6. The method of claim 3, wherein each of the influences comprises an influence between an influencing code region and an influenced code region, wherein the influence indicates a change of a first value that is associated with the influenced code region with a second value that is associated with the influencing code region.

7. The method of claim 1, comprising determining the characterization of the code region to indicate that the code region is an input, in response to a determination that the code region only influences other code regions without being influenced by the other code regions, and determining the characterization of the code region to indicate that the code region is an output in response to a determination that the code region is only influenced by other code region s without influencing the other code regions.

8. The method of claim 1, wherein the code patch comprises one or more code regions that match a pattern of interest.

9. The method of claim 1, wherein the code patch comprises the potentially exploitable propagation path.

10. The method of claim 1, wherein the code region comprises at least one of: a function argument, a return value, a condition branch, a global variable, and an offset of a buffer.

11. The method of claim 1, wherein the code region is characterized by a role thereof in the binary code.

12. The method of claim 1, wherein the potentially exploitable propagation path indicates a reachability of the code region within the binary code.

13. The method of claim 1, wherein the code patch excludes at least one code element from the binary code that is not utilized for performing the functionality of interest of the code patch.

14. A system comprising a processor and coupled memory, the processor being adapted to:
obtain a binary code of an embedded device;
performing static analysis of the binary code to identify a potentially vulnerable code region, wherein the potentially vulnerable code region is associated with providing input or output from code units of the binary code;
identify propagation paths associated with the potentially vulnerable code region in the binary code;
analyze the propagation paths to identify a potentially exploitable propagation path, wherein the potentially exploitable propagation path is potentially affected by external input that is inputted to a device executing the binary code;
determine a code patch associated with the potentially exploitable propagation path;
perform fuzz testing on the code patch independently from the binary code, whereby detecting embedded code vulnerabilities; and
wherein said perform the fuzz testing comprises:
generating an emulation of the code patch independently from the binary code;
detecting vulnerabilities of the code patch by fuzz testing the emulation;
wherein the static analysis comprises:
determining a characterization of the code region based on influences between the code region and at least another code region in the binary code, wherein the characterization of the code region indicates a role of the code region in the binary code;
based on the characterization of the code region, determining that the code region is potentially affected by external input that is inputted to the device executing the binary code;
wherein said identifying the potentially exploitable propagation path comprises:
determining for the code region a corresponding potentially exploitable propagation path within the binary code, wherein the corresponding potentially exploitable propagation path indicates a reachability of the code region within the binary code;
locating in the binary code the code patch, wherein the code patch is associated with a functionality of interest of the binary code, wherein the code patch is associated with the potentially exploitable propagation path of the code region, wherein the code patch comprises the code region, wherein the code patch can be executed independently from the binary code.

15. The system of claim 14, wherein the emulation is generated based on a characterization of the code region indicating the role of the code region in the binary code, wherein the emulation is generated based on influences between the code region and other code regions in the binary code.

16. A computer program product comprising a non-transitory computer readable storage medium retaining program instructions, which program instructions when read by a processor, cause the processor to perform: obtaining a binary code of an embedded device;
performing static analysis of the binary code to identify a potentially vulnerable code region, wherein the potentially vulnerable code region is associated with providing input or output from code units of the binary code;
identifying propagation paths associated with the potentially vulnerable code region in the binary code;
analyzing the propagation paths to identify a potentially exploitable propagation path, wherein the potentially exploitable propagation path is potentially affected by external input that is inputted to a device executing the binary code;
determining a code patch associated with the potentially exploitable propagation path;
performing fuzz testing on the code patch independently from the binary code, whereby detecting embedded code vulnerabilities; and
wherein said performing the fuzz testing comprises:
generating an emulation of the code patch independently from the binary code;
detecting vulnerabilities of the code patch by fuzz testing the emulation;
wherein the static analysis comprises:
determining a characterization of the code region based on influences between the code region and at least another code region in the binary code, wherein the characterization of the code region indicates a role of the code region in the binary code;
based on the characterization of the code region, determining that the code region is potentially affected by external input that is inputted to the device executing the binary code;
wherein said identifying the potentially exploitable propagation path comprises:
determining for the code region a corresponding potentially exploitable propagation path within the binary code, wherein the corresponding potentially exploitable propagation path indicates a reachability of the code region within the binary code;
locating in the binary code the code patch, wherein the code patch is associated with a functionality of interest of the binary code, wherein the code patch is associated with the potentially exploitable propagation path of the code region, wherein the code patch comprises the code region, wherein the code patch can be executed independently from the binary code.

* * * * *